March 7, 1944.  J. S. SHARPE  2,343,334
MECHANICAL MOVEMENT
Filed Dec. 31, 1942  3 Sheets-Sheet 1
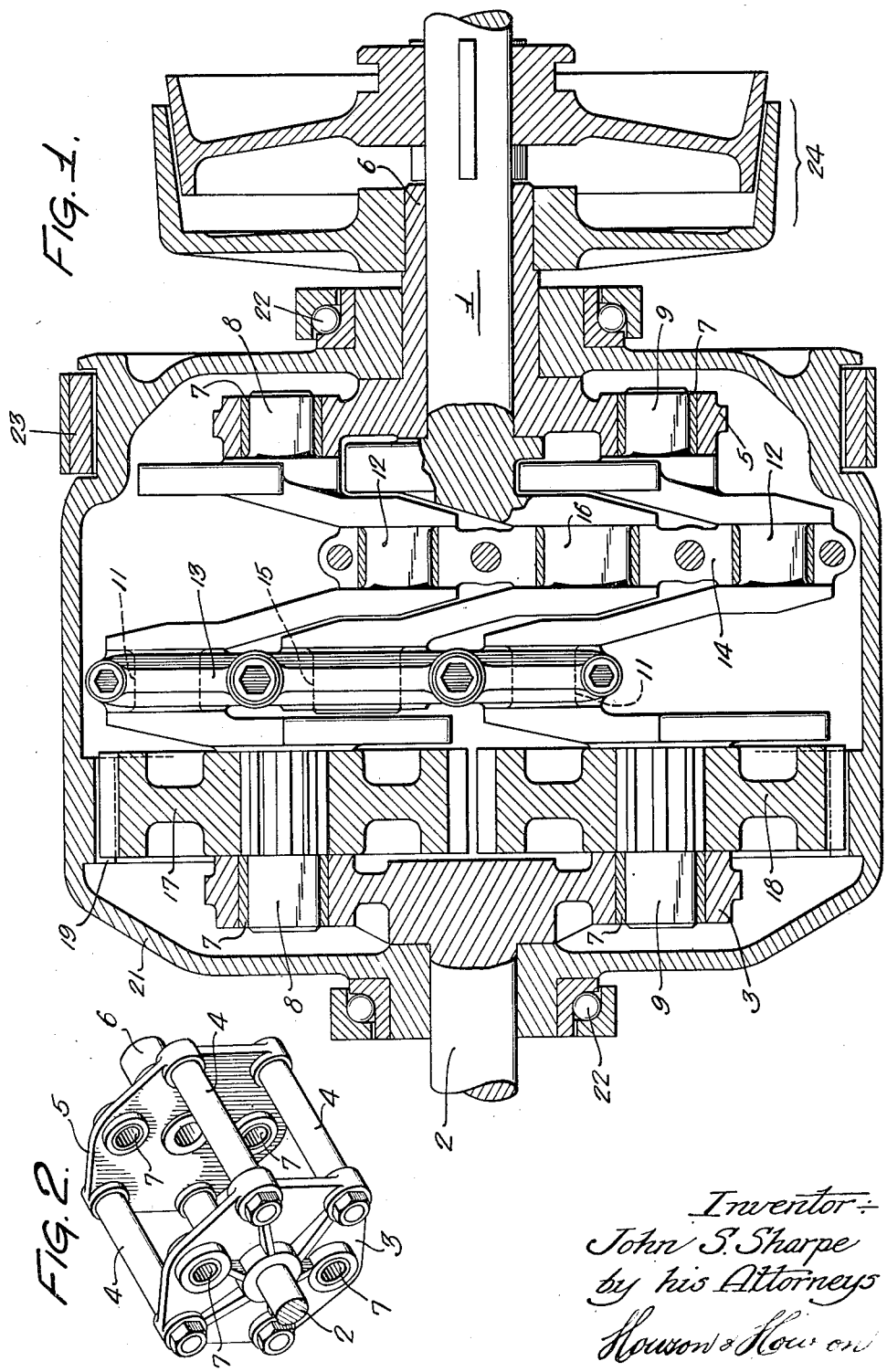
Inventor:
John S. Sharpe
by his Attorneys
Howson & Howson March 7, 1944.    J. S. SHARPE    2,343,334
MECHANICAL MOVEMENT
Filed Dec. 31, 1942    3 Sheets-Sheet 2

Inventor:
John S. Sharpe
by his Attorneys
Howson + Howson

March 7, 1944.　　　J. S. SHARPE　　　2,343,334
MECHANICAL MOVEMENT
Filed Dec. 31, 1942　　　3 Sheets-Sheet 3
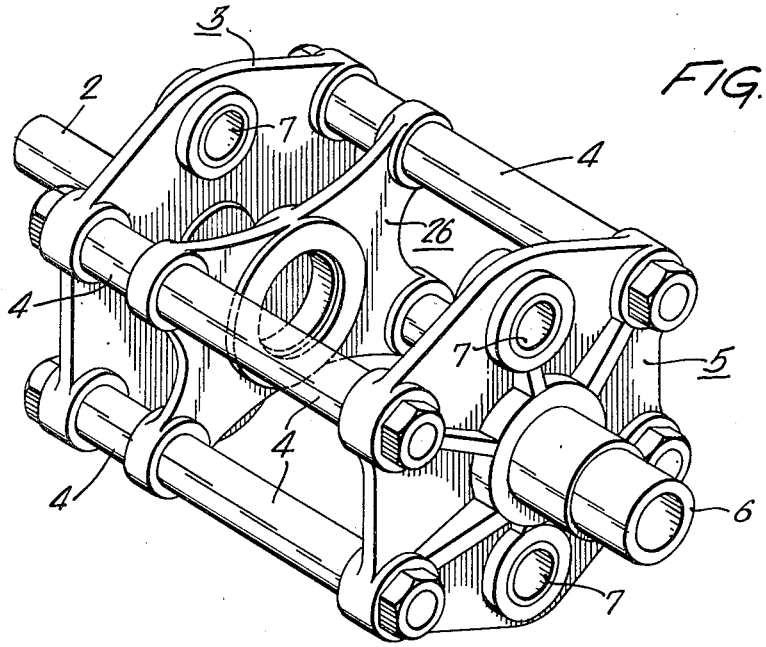
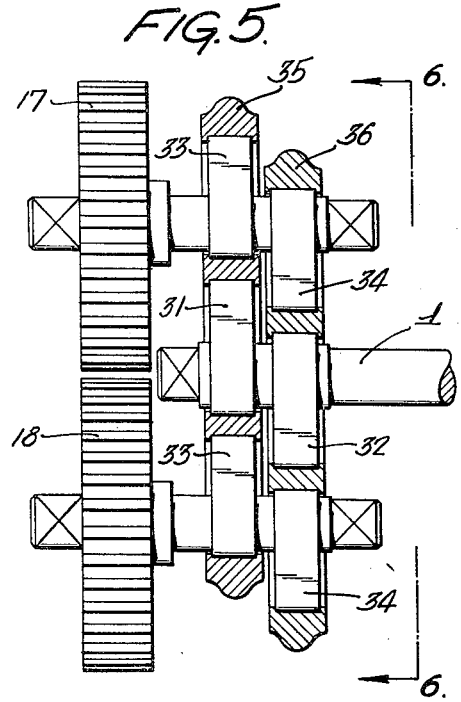
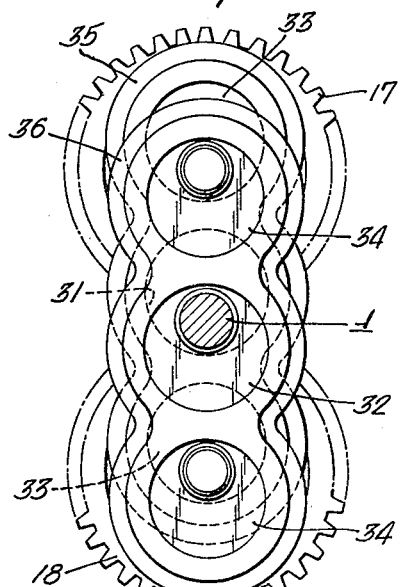
Inventor:
John S. Sharpe
by his Attorneys
Howson + Howson Patented Mar. 7, 1944

2,343,334

UNITED STATES PATENT OFFICE 2,343,334

MECHANICAL MOVEMENT

John S. Sharpe, Haverford, Pa.

Application December 31, 1942, Serial No. 470,740

17 Claims. (Cl. 74—298)

A principal object of this invention is to provide a new mechanical movement, said movement being primarily useful in the field of power transmission.

The invention is illustrated in the attached drawings, wherein:

Fig. 1 is an axial sectional view of a reverse gear unit incorporating the invention;

Fig. 2 is a detached view in perspective of one of the elements of the device;

Fig. 4 is a detached view in perspective of an element of the unit shown in Fig. 3;

Fig. 5 is a fragmentary axial sectional view illustrating another modification, and Fig. 6 is a sectional view on the line 6—6, Fig. 5.

Figure 3:
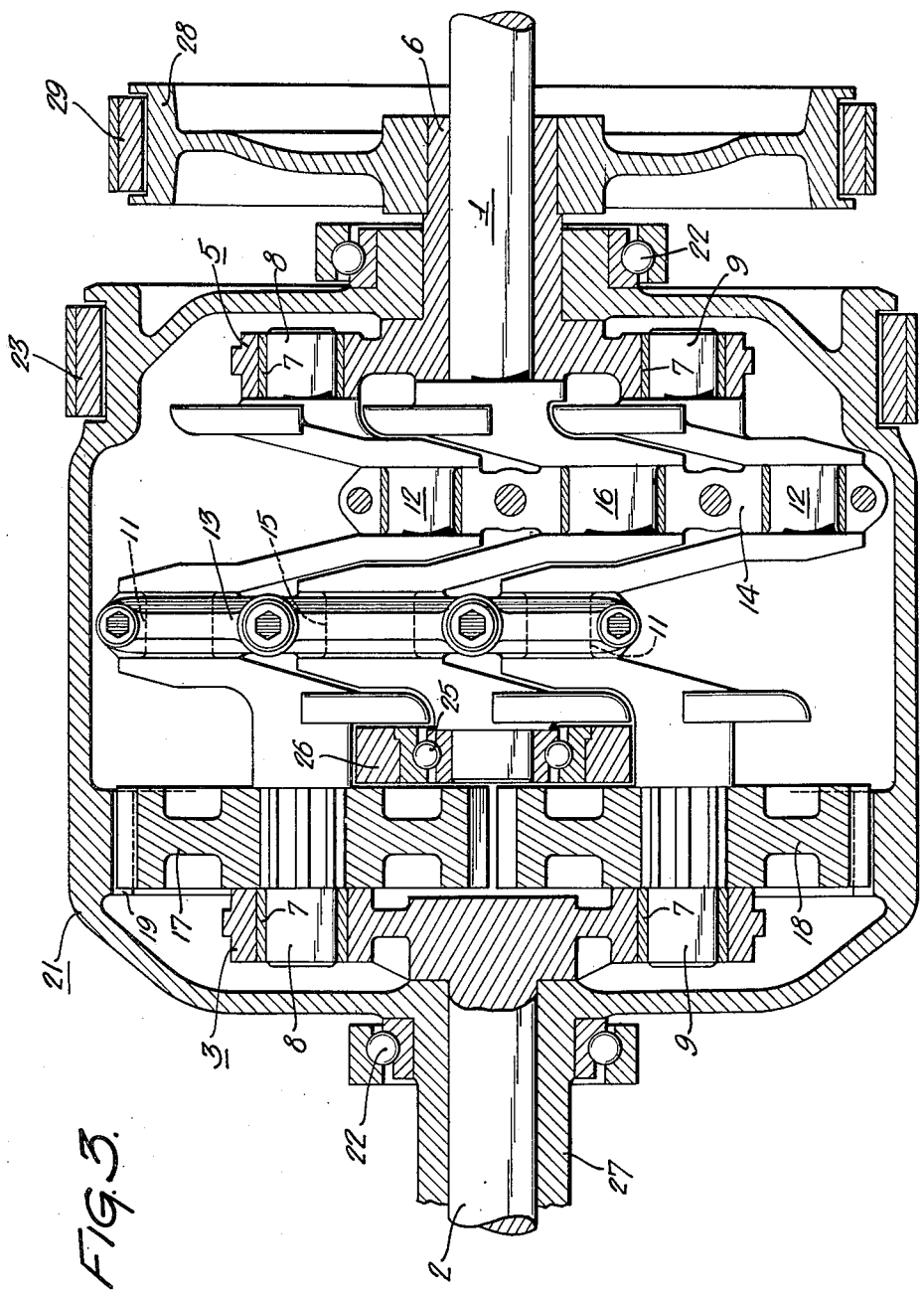
Fig. 3 is an axial sectional view of a transmission unit illustrating another embodiment of the invention.

With reference to the particular embodiment of the invention illustrated in Figs. 1 and 2, the use therein of the said mechanical movement confers certain highly desirable characteristics which contribute in a material degree to the factors of strength, durability and power-transmitting capacity of the transmission. In this device, the mechanical movement also contributes to the balancing, both statically and dynamically, of the mechanism without the use of heavy counterweights. Further and of primary importance, the mechanical movement affords certain highly desirable constant torque conditions in the mechanism, together with the elimination of undesirable dead center conditions, all as hereinafter specifically described.

With reference to the drawings, the reverse gear mechanism therein disclosed and embodying the mechanical movement consists of two coaxially arranged shafts 1 and 2, one of these shafts constituting the drive shaft of the unit and the other the driven shaft. On the end of the shaft 2 is a flange 3, and this flange is rigidly connected by bolts 4 to a corresponding flange element 5, this element having a hub portion 6 which closely embraces the shaft 1 as shown. The flanges 3 and 5 and the connecting bolts 4 constitute in effect an integral part of the shaft 2.

Supported in bearings 7 in the flanges 3 and 5 is a plurality of shafts, these shafts being two in number in the present instance and being designated respectively by the reference numerals 8 and 9. The axes of these shafts are parallel to the common axis of the shafts 1 and 2, and they are disposed in the flange structure 3—5 symmetrically with respect to the common axis of the shafts 1 and 2; that is to say, the shafts 8 and 9 are arranged at diametrically opposite sides of the said common axis and equidistant from the latter. Should more than two of these shafts be used, they would be correspondingly uniformly spaced around the said common axis so as to maintain the desirable symmetrical arrangement. The shafts 8 and 9 are preferably identical, as shown, and each is provided with a plurality of cranks, two in number in the present instance and identified by the reference 11 and 12, the corresponding cranks of the two shafts being designated by the same reference numerals. The cranks 11 and 12 of each shaft are symmetrically arranged with respect to the axis of the shaft, being equidistant from the said axis and extending in diametrically opposite directions from the axis.

The corresponding cranks 11 of the shafts are connected by a rigid connecting rod 13, and a corresponding rod 14 connects the cranks 12, 12. The connecting rods 13 and 14 also function to connect operatively to the cranks 11 and 12 respectively the pins 15 and 16 of a pair of cranks on the shaft 1, said cranks having the same throw as the cranks 11 and 12 and being correspondingly symmetrically arranged with respect to the axis of the shaft 1.

Each of the shafts 8 and 9 has secured thereto a toothed pinion, 17 and 18 respectively, and these pinions mesh with an orbital gear 19, forming with the latter a planetary system centering on the common axis of the shafts 1 and 2. The orbital gear 19, which is coaxial with the said common axis of the shafts 1 and 2, is carried in the present instance upon a housing 21 which is journalled at its respective ends upon the shaft 2 and the hub element 6, and which has at said ends anti-friction bearings 22, 22 through which the entire assembly may be journalled on a suitable relatively fixed structure. Associated with the housing 21 is a brake 23 which when tightened on the housing immobilizes the latter and holds it stationary, whereas when the brake is released, the housing 21 is free to rotate about the axis of the shafts 1 and 2. Means is also provided in the form of a clutch 24 for directly connecting the shaft 1 with the hub element 6 of the flange 5, and through this flange, the bolts 4, and the flange 3, with the shaft 2.

Let it now be assumed that the shaft 1 is connected to a suitable source of power, and the shaft 2 to a driven element, such for example, as a propeller. With the brake 23 released and the clutch 24 engaged the shafts 1 and 2 are locked together so that the drive from the one to the other is direct and in the same direction. Under these circumstances, the shafts 8 and 9 remain fixed with respect to the shafts 1 and 2, as also do the pinions 17 and 18, so that the entire device, including the housing, rotates as a unit If now the clutch 24 is released and the brake 23 tightened on the housing 21 so as to immobilize the latter, the cranks 15 and 16 acting through the shafts 8 and 9 will effect a rotation of the latter shafts, and therewith of the pinions 17 and 18, this rotation of the pinions causing them to track in a direction reverse to the rotation of the shaft 1 around the now stationary orbital gear 19, thereby causing a rotation in the reverse direction of the shaft 2. By employing only two of the shafts 8 and 9 and pinions 17 and 18, it is possible to give the pinions a diameter closely approaching one-half the diameter of the orbital gear 19, so that the speed of rotation of the shaft 2 is only slightly less than the speed of rotation of the shaft 1. The device as shown, therefore, affords a reversing gear affording a substantially 100% reverse drive. Obviously the ratio of the speeds between the shafts 1 and 2 may be varied by changing the diameters of the pinions 17 and 18; and a reverse overdrive may be obtained by driving through the shaft 2 instead of the shaft 1.

It is to be noted that the pinions 17 and 18 are, in effect, journaled upon the shaft 2, and that the cranks 11 and 12 of the shafts 8 and 9 form in effect extensions of the respective pinions. Therefore the transfer of energy between the pinions and the shaft 1 occurs in each instance between two points on the pinion at diametrically opposite sides of the rotary axis of the pinion (said points being represented respectively by the pins of the cranks 11 and 12) and the crank pins 15 and 16 respectively of the shaft. Also, in this transfer, the forces applied to or through the said points on the pinions are always in a tangential direction. Torque is substantially constant and uniform, and dead centering is eliminated.

The embodiment of the invention illustrated in Figs. 3 and 4 comprises essentially the same combination of elements described above, and these elements have been designated by the same reference characters previously employed. In this instance, the inner end of the crank shaft 1 is supported in a bearing 25 which is provided in a flange plate 26 rigidly mounted on the bolts 4 between the flanges 3 and 5. In this instance, also, the housing 21 has at one end a hollow shaft 27 which embraces the shaft 2, and the hub portion 6 of the flange 5 has attached thereto a brake drum 28 instead of the clutch element of the previously described embodiment. A brake band 29 is associated with the drum 28 in the usual manner.

This embodiment is adapted for use in a compensating contra propeller drive, the propellers being attached respectively to the shafts 2 and 27. When both of the brake bands 23 and 29 are released, power from the shaft 1 is transmitted to the propeller shafts which tend to rotate in opposite directions. The aforesaid transmission is, however, at unequal torques the torque on the shaft 27 which rotates in the same direction as the shaft 1 being approximately twice that of the torque on the shaft 2. Thus the shaft 27 will tend normally to rotate faster than the shaft 2 and if the forces opposing rotation of the shafts is the same, the speed of rotation of the shaft 27 will be approximately twice that of the shaft 2. When the brake band 29 is applied the shaft 2 is immobilized and the shaft 27 will then rotate in the same direction as the shaft 1 as before at approximately half the speed of the shaft. When the band 29 is released and the band 23 applied, the shaft 27 is immobilized and the shaft 2 will then rotate in a direction counter to the shaft 1 and at approximately the same speed. It is apparent that the speed and torque ratio may be varied by changing the diameters of the pinions 17 and 18.

Instead of the crank arrangement shown in Figs. 1 to 4, I may employ eccentrics as illustrated in Figs. 5 and 6. Thus the shaft 1 may be provided with the eccentrics 31 and 32 in lieu of the cranks 15 and 16; and the cranks 11 and 12 of the shafts 8 and 9 are similarly replaced by eccentrics 33 and 34 respectively. Suitable straps 35 and 36 respectively connect the eccentrics 31 and 32 with the eccentrics 33 and 34. The eccentric, while having certain peculiar characteristics of its own, may for the purpose of the invention be considered another form of crank, and the term "crank" as used in the appended claims will be understood as embracive of both devices.

I claim:

1. In a mechanical movement, coaxial shafts, a planetary assembly comprising a member coaxial with the shafts and a plurality of planetary elements journaled on one of the shafts on axes offset from the shaft axis and coactive with said member, a plurality of cranks on the other of said shafts angularly offset with respect to each other, a plurality of cranks connected with each of the planetary elements and correspondingly angularly offset about the axis of the element, and means for connecting the cranks of said shaft respectively with the corresponding cranks of the planetary elements.

2. In a mechanical movement, coaxial shafts, a planetary assembly comprising a member coaxial with the shafts and a plurality of planetary elements journaled on one of the shafts on axes correspondingly offset from the shaft axis and symmetrically arranged around said axis and coactive with said member, a plurality of cranks on the other of said shafts symmetrically distributed about the axis of the shaft, a plurality of cranks connected with each of the planetary elements and correspondingly angularly offset about the axis of the element, and means for connecting the cranks of said shaft respectively with the corresponding cranks of the planetary elements.

3. In a mechanical movement, coaxial shafts, a rigid structure carried by one of said shafts and comprising a member coaxially embracing the second of said shafts, a pair of crank shafts journaled in said structure in parallel relation to said first-named shafts and at diametrically opposite sides of the latter, a planetary assembly comprising a gear coaxial with the shafts first named and a planetary element secured to each of said crank shafts and coactive with said gear, a pair of diametrically opposed cranks on the said second shaft, a corresponding pair of cranks on each of said crank shafts, rigid means for operatively connecting the corresponding cranks of the several shafts, means for selectively immobilizing the first named gear of the planetary assembly and releasing said gear for rotation about its axis, and means for selectively uniting and disuniting the first-named shafts.

4. In a mechanical movement, coaxial shafts, a planetary assembly comprising a member coaxial with the shafts and a plurality of planetary elements journaled on one of the shafts on axes offset from the shaft axis and coactive with said member, a plurality of cranks on the end of the other of said shafts, said cranks being angularly offset with respect to each other and the said shaft end being free and unsupported from a point on the shaft inwardly of the cranks, a plurality of cranks connected with each of the planetary elements and correspondingly angularly offset about the axis of the element, and rigid means for connecting the cranks of said shaft respectively with the corresponding cranks with the planetary elements.

5. In a mechanical movement, coaxial shafts, a planetary assembly comprising a member coaxial with and attached to one of the shafts and a coactive planetary element journaled on another of the shafts on an axis offset from the shaft axis, a plurality of cranks on still another of the shafts angularly offset with respect to each other, a plurality of cranks connected with the planetary element and correspondingly angularly offset about the axis of the element, and means for connecting the cranks of said shaft respectively with the corresponding cranks of the planetary element, and means for selectively and individually releasably immobilizing the first and second named of said shafts.

6. In a mechanical movement, coaxial shafts, a planetary assembly comprising a member coaxial with and attached to one of the shafts and a coactive planetary element journaled on another of the shafts on an axis offset from the shaft axis, a plurality of cranks on still another of the shafts symmetrically distributed about the axis of the shaft, a plurality of cranks connected with the planetary element and correspondingly symmetrically distributed about the axis of the element and means for connecting the cranks of the shaft respectively with the corresponding cranks of the planetary element, and means for selectively and individually releasably immobilizing the first and second named of said shafts.

7. In a mechanical movement, coaxial shafts, a rigid structure carried by one of said shafts and comprising a member coaxially embracing a second of said shafts, a pair of crank shafts journaled in said structure in parallel relation to said first named shafts and at diametrically opposite sides of the latter, a planetary assembly comprising a gear coaxial with the shafts first named, and a planetary element secured to each of said crank shafts and coactive with said gear, a pair of diametrically opposed cranks on the said second shafts, a corresponding pair of cranks on each of said crank shafts, rigid means for operatively connecting the corresponding cranks of the several shafts, and means for selectively and individually releasably immobilizing the first and second named of the shafts.

8. In a mechanical movement, coaxial shafts. a planetary assembly comprising a member coaxial with and attached to one of the shafts, and a plurality of coactive planetary elements journaled on another of the shafts on axes offset from the shaft axis, a plurality of cranks on still another of the shafts angularly offset with respect to each other, a plurality of cranks connected with each of the planetary elements and correspondingly angularly offset about the axis of the element, means for connecting the cranks of said shafts respectively with the corresponding cranks of the planetary element, and means for selectively and individually releasably immobilizing the first and second named of said shafts.

9. In a mechanical movement, coaxial shafts, a rigid structure carried by one of said shafts and comprising a member coaxially embracing a second of said shafts, a crank shaft journaled in said structure in parallel relation to first of said named shafts, a planetary assembly comprising a gear coaxial with the shafts first named, and a planetary element secured to said crank shaft coactive with said gear, a pair of diametrically opposed cranks on the said second shaft, a corresponding pair of cranks on said crank shaft, rigid means for operatively connecting the corresponding cranks of the shafts, and means in said structure forming a bearing for the inner end of said second shaft.

10. In a mechanical movement, coaxial shafts, a planetary assembly comprising a member coaxial with the shafts and a plurality of coactive planetary elements journaled on one of the shafts on axes offset from the shaft axis, a plurality of cranks on the other of said shafts axially spaced and angularly offset with respect to each other, a plurality of cranks connected with each of the planetary elements and correspondingly axially spaced and angularly offset with reference to the axis of the element, and means for connecting the cranks of said shaft respectively with the corresponding cranks of the planetary elements.

11. In a mechanical movement, coaxial shafts, a planetary assembly comprising a member coaxial with the shafts and a plurality of coactive planetary elements journaled on one of the shafts on axes offset from the shaft axis, a plurality of cranks on the other of said shafts spaced longitudinally of and symmetrically distributed about the axis of the shaft, a plurality of cranks connected with each of the planetary elements and correspondingly longitudinally spaced and symmetrically distributed with reference to the axis of the element, and means for connecting the cranks of the shaft respectively with the corresponding cranks of the planetary elements.

12. In a mechanical movement, coaxial shafts, a planetary assembly comprising a member coaxial with the shafts and a plurality of coactive planetary elements journaled on one of the shafts on axes offset from the shaft axis, a plurality of cranks on the other of said shafts spaced longitudinally of and symmetrically distributed about the axis of the shaft, a crank shaft coaxially connected to each of the planetary elements and having a plurality of cranks corresponding to the cranks on said shaft and correspondingly longitudinally spaced and symmetrically distributed with reference to the axis of the shaft, and means for connecting together the corresponding cranks of the said several crank shafts.

13. In a mechanical movement, coaxial shafts, a planetary assembly comprising a member coaxial with the shafts and a plurality of coactive planetary elements journaled on one of the shafts on axes offset from the shaft axis, a plurality of cranks on the other of said shafts axially spaced and angularly offset with respect to each other, a plurality of cranks connected with each of the planatary elements and correspondingly axially spaced and angularly offset with reference to the axis of the element, means for connecting the cranks of said shaft respectively with the corresponding cranks of the planetary elements, means for selectively immobilizing the first-named member of the planetary assembly and releasing the said member for rotation about the common axis of said shafts, and means for selectively uniting and disuniting said shafts.

14. In a mechanical movement, coaxial shafts, a planetary assembly comprising a member coaxial with the shafts and a plurality of coactive planetary elements journaled on one of the shafts on axes offset from the shaft axis, a plurality of cranks on the other of said shafts spaced longitudinally of and symmetrically distributed about the axis of the shaft, a plurality of cranks connected with each of the planetary elements and correspondingly longitudinally spaced and symmetrically distributed with reference to the axis of the element, means for connecting the cranks of the shaft respectively with the corresponding cranks of the planetary elements, means for selectively immobilizing the first named member of the planetary assembly and releasing the member for rotation about the common axis of the shafts, and means for selectively uniting and disuniting said shafts.

15. In a mechanical movement, coaxial shafts, a planetary assembly comprising an orbital member coaxial with the shafts and a plurality of coactive planetary elements journaled on one of the shafts on axes offset from the shaft axis, a plurality of cranks on the other of said shafts axially spaced and angularly offset with respect to each other, a plurality of cranks connected with each of the planetary elements and correspondingly axially spaced and angularly offset with reference to the axis of the element, and means for connecting the cranks of said shaft respectively with the corresponding cranks of the planetary elements.

16. In a mechanical movement, coaxial shafts, a planetary assembly comprising an orbital member coaxial with the shafts and a plurality of coactive planetary elements journaled on one of the shafts on axes offset from the shaft axis, a plurality of cranks on the other of said shafts spaced longitudinally of and symmetrically distributed about the axis of the shaft, a plurality of cranks connected with each of the planetary elements and correspondingly longitudinally spaced and symmetrically distributed with reference to the axis of the element, means for connecting the cranks of the shaft respectively with the corresponding cranks of the planetary elements, means for selectively immobilizing the orbital gear and releasing the gear for rotation about the common axis of the shafts, and means for selectively uniting and disuniting said shafts.

17. In a mechanical movement, coaxial shafts, a planetary assembly comprising a member coaxial with the shafts and a plurality of coactive planetary elements journaled on one of the shafts on axes offset from the shaft axis; a plurality of cranks on the other of said shafts, said cranks being axially spaced and angularly offset with respect to each other, and the said shaft end being free and unsupported from a point on the shaft inwardly of the cranks, a plurality of cranks connected with each of the planetary elements and correspondingly axially spaced and angularly offset with reference to the axis of the element, and means for connecting the cranks of said shaft respectively with the corresponding cranks of the planetary elements.

JOHN S. SHARPE.